United States Patent [19]

Van Raalte et al.

[11] 3,880,725

[45] Apr. 29, 1975

[54] PREDETERMINED THICKNESS PROFILES THROUGH ELECTROPLATING

[75] Inventors: John A. Van Raalte, Princeton; Victor Christiano, Hamilton Sq., both of N.J.

[73] Assignee: RCA Corporation, New York, N.Y.

[22] Filed: Apr. 10, 1974

[21] Appl. No.: 459,590

[52] U.S. Cl. .............. 204/15; 204/231; 204/DIG. 7
[51] Int. Cl. .......................... C23b 5/48; C23b 5/68
[58] Field of Search ........ 204/DIG. 7, 15, 231, 224, 204/287, 297

[56] References Cited

UNITED STATES PATENTS

| | | | |
|---|---|---|---|
| 1,526,644 | 2/1925 | Pinney | 204/DIG. 7 |
| 2,044,431 | 6/1936 | Harrison | 204/DIG. 7 |
| 3,023,154 | 2/1962 | Hough et al. | 204/DIG. 7 |
| 3,437,578 | 4/1969 | Gibbs et al. | 204/DIG. 7 |
| 3,573,175 | 3/1971 | Bedi | 204/15 |

FOREIGN PATENTS OR APPLICATIONS

| | | | |
|---|---|---|---|
| 456,840 | 3/1928 | Germany | 204/DIG. 7 |

*Primary Examiner*—T. M. Tufariello
*Attorney, Agent, or Firm*—G. H. Bruestle; D. S. Cohen; C. L. Silverman

[57] ABSTRACT

A metal film having a predetermined thickness profile is obtained on a surface of an article through electroplating. The electroplating of the metal film on the article is done with an apparatus including a plurality of modifying electrodes and a body of plating material suspended in a plating solution. Electrical potentials are established at the article to be plated, the body of plating material, and at each one of the modifying electrodes. The particular electrical potential at the article, the body of plating material and at each one of the modifying electrodes is chosen to provide differences in electrical potential which result in a metal film having the predetermined thickness profile.

4 Claims, 2 Drawing Figures

PREDETERMINED THICKNESS PROFILES THROUGH ELECTROPLATING

BACKGROUND OF THE INVENTION

This invention relates to electroplating, and particularly to electroplating wherein a metal film having a predetermined thickness profile is formed.

Often, in the use of electroplating, it is necessary to control the thickness profile of a metal film to be formed, e.g., a metal film may be required where the surface is to be substantially flat, thicker at the edges or thinner at the edges, etc. Present methods include providing a second anode to plate the article more heavily in predetermined surface areas or a second electrode to reduce the plating in a predetermined surface area. Although these methods are successful for many applications, these methods generally involve unwieldly plating geometries and a lack of precise control.

The problem of obtaining a metal film having a predetermined thickness profile is often encountered in the construction of light valves. Light valves include electrostatically deformable films wherein an electrostatic charge pattern deposited on one side in accordance with external video signals acts on the adjacent light reflective film to produce a corresponding pattern of local deformations therein. By means of a Schlieren optical system known in the art, light is directed to the film and selectively redirected therefrom in accordance with patterns of local deformations of the film. The image thus produced corresponds in intensity and distribution to the deformations in the film and therefore corresponds to the video signals. Light valves may incorporate as deformable films those comprised of oil, thermoplastic material or metal. Often, when a metal film is used, the metal film is applied, over a grating, through the well known process of electroplating. Prior to electroplating, the grating is polished, e.g., lapped. During the polishing process, the edge surfaces are polished further than the center surfaces, resulting in a film that is closer to the substrate at the edges than at the center. Such a film causes difficulty in operation as the edge surfaces of the film are closer to the electrostatic charge than the center portions, thereby causing the edges to be much more sensitive than the center area. One way to compensate for this undesirable sensitivity is to make the film stronger at the edges, e.g., thicker at the edges. It would therefore be desirable to develop a method whereby a metal film having a predetermined thickness profile can be accurately and easily formed on a surface of an article to be plated.

SUMMARY OF THE INVENTION

A metal film having a predetermined thickness profile the obtained on a surface of an article to be plated through electroplating. The article to be plated, a body of plating material and at least one modifying electrode are placed in a plating solution. The modifying electrode is positioned in such a way that surface areas of the article to be least heavily plated are in active relation with the modifying electrode. The body of plating material is positioned in such a way that surface areas of the article to be most heavily plated are in active relation with the body. Means are provided for establishing differences in electrical potential between the article, the body of plating material and the modifying electrode.

DETAILED DESCRIPTION

Figure 1:
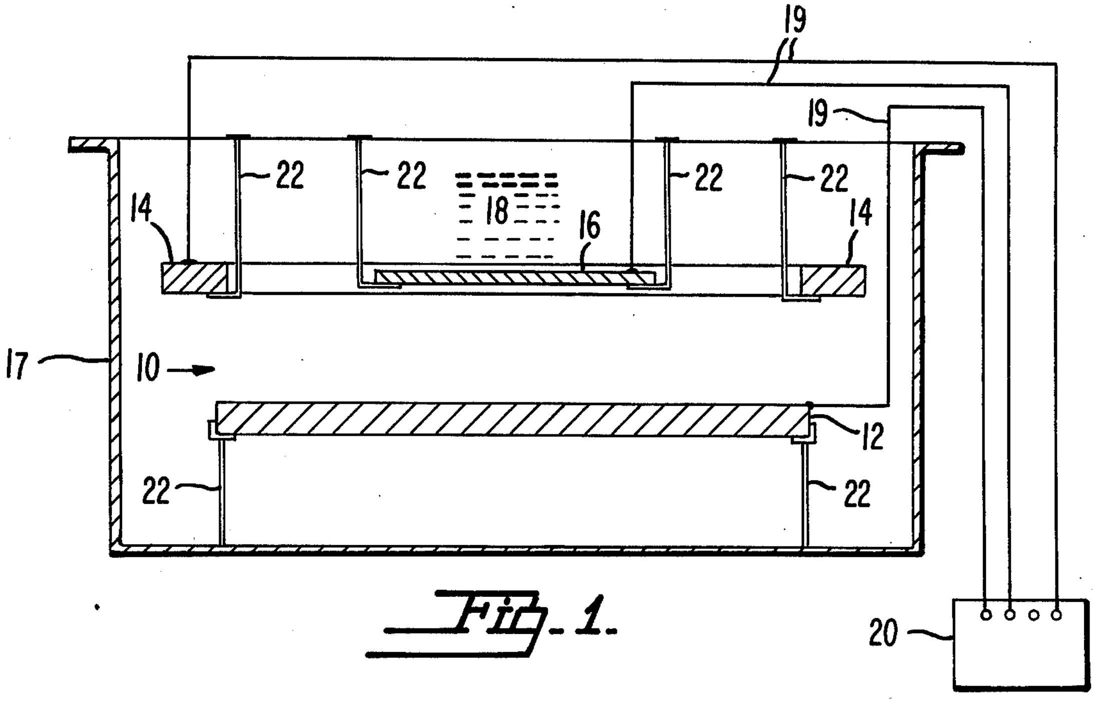
FIG. 1 is a sectional view of one form of an apparatus of the present invention.

Referring initially to FIG. 1, one form of the apparatus of the present invention is designated generally as 10. The apparatus 10 is designed to form an electroplated metal film on the surface of an article 12 with the edge thickness of the film greater than the center thickness of the film. The surface of the article 12 should be somewhat conductive and capable of maintaining an electrical potential, e.g., a metal. The apparatus 10 includes a body 14 of plating material, e.g., nickel, and an electrically conductive modifying electrode 16. The body 14 of plating material and the modifying electrode 16 are each in active relation with the article 12, i.e., electroplating can occur between the body 14 and the article 12, and the modifying electrode 16 can draw plating material away from the article 12. In order to obtain a metal film having a predetermined thickness profile it is necessary that the surface areas of the article to be least heavily plated are in active relation with the modifying electrode and the surface areas of the article to be most heavily plated are in active relation with the body of plating material. The apparatus 10 is placed in a non-conductive vessel 17 containing an electroplating solution 18, such as nickel sulfate. The article 12, the body 14 of plating material and the modifying electrode 16 are each provided with electrical connections 19, such as ordinary insulated wire, to a source 20 of electrical energy. The source 20 of electrical energy should be capable of providing a variable electrical potential to each of the article 12, the body 14 of plating material and the modifying electrode 16, e.g., a variable power supply. The members of the apparatus 10 can be supported in the proper position through any conventional means, e.g., clamps 22 of inert material.

The apparatus 10 of the present invention can be utilized to form a metal film having a predetermined thickness profile on a surface of an article 12 of about 2 inches by 2 inches. For example, a thickness profile can be obtained wherein the ratio of the thickness of the edge to the center of the plated metal film is approximately 4 to 1. Specifically, to obtain such a profile, the article 12, e.g., the 2 inches by 2 inches substrate, is placed in the solution 18 and electrically connected to a source 20 of electrical energy as shown in FIG. 1. The electrical connections can be obtained by any well known method, e.g., ordinary insulated wire. For a metal film having such a predetermined thickness profile, the body 14 of plating material can be square shaped and includes an opening of approximately 2 inches by 2 inches in its center. The body 14 of plating material is placed in active relation with the article 12, i.e., positioned so that electroplating will take place, with the 2 inches by 2 inches opening in the body 14 of plating material substantially aligned with the edge surfaces of the article 12 and transversely spaced from the article 12 about 1 or 2 inches. The modifying electrode 16 is circular and is placed above the center of the article 12 in substantially the same plane as the body 14. The diameter of the modifying electrode 16 is less than the opening diameter of the body 14, e.g., 1 inch. The modifying electrode 16 is also connected to the source 20 of electrical energy. The clamps 22 of inert material can be provided for supporting the article 12, the body 14 of plating material and the modifying electrode 16.

To carry out the method of the present invention, the electrical energy source 20 is utilized to vary the electrical potential on the body 14 of plating material, the article 12 and the modifying electrode 16. Varying the electrical potential at each of the respective members of the apparatus 10 establishes relative differences in electrical potential which can be utilized to form a metal film having a predetermined thickness profile on the article 12. The electrical potential is adjusted in such a manner that the article 12 is negative with respect to the body 14 of plating material. The difference in electrical potential between the body 14 and the article 12 causes the positive nickel ions to migrate through the electroplating solution 18 toward the article 12. As is well known, varying the relative electrical potential difference between the body 14 and the article 12 determines the plating rate.

In accordance with the method of the present invention, for more selective control of the thickness profile of the film, the electrical energy source 20 is employed to provide differences in electrical potential between the article 12, the body 14 of plating material and the modifying electrode 16 as in FIG. 1. Varying the electrical potential of the article 12 and the modifying electrode 16 permits the ions that would normally migrate toward the article 12 to be selectively drawn toward the modifying electrode 16. For example, varying the relative electrical potentials of the body 14 of the plating material, the article 12 and the modifying electrode 16 permits the center to edge thickness of the film to be controlled, and, if desired, plating on the center of the article 12 can be prevented.

Although the method of the present invention has been described with one modifying electrode 16, for the purposes of a particular thickness profile as in FIG. 1, the method is equally successful if a plurality of modifying electrodes 16 and/or bodies 14 of plating material are utilized. The use of a plurality of modifying electrodes or bodies of plating material permits the employment of an apparatus which can be utilized for a metal film having any thickness profile desired without the necessity of choosing electrodes and bodies of plating material of a particular shape or geometry. For example, FIG. 2 shows one form of an apparatus 110 of the present invention in which a plurality of modifying electrodes 116 are spaced from the article 112 to be plated.

Figure 2:
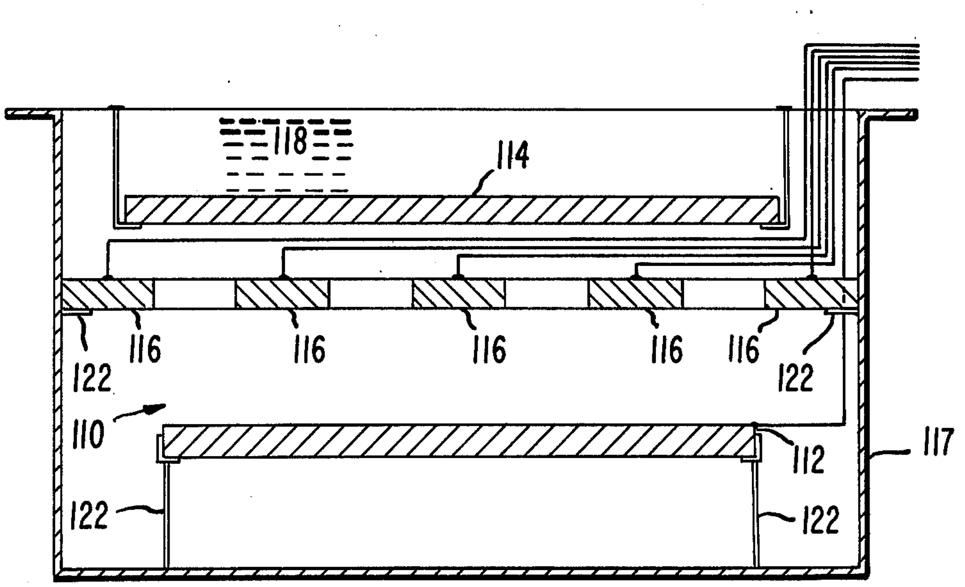
FIG. 2 is a sectional view of another form of an apparatus of the present invention.

Each one of the plurality of modifying electrodes 116 is spaced from the article 112 to be plated so as to be in active relation with the article 112 as shown in FIG. 2. The modifying electrodes 116 can take the form of a grid as shown in FIG. 2. Such an arrangement of the modifying electrodes 116 can be easily constructed by methods well known in the art, e.g., machined to shape. Each one of the modifying electrodes 116 is electrically connected to a source of electrical energy (not shown) in such a manner whereby an electrical potential can be established at each one of the modifying electrodes 116. The body 114 of plating material can be spaced from the article 112 to be plated as shown in FIG. 2 or in any other way wherein the body 114 is in active relation with the article 112. Varying the relative electrical potentials at the article 112, the body 114 of plating material and each one of the modifying electrodes 116 as previously described causes differences in electrical potential to be established between the article 112, the body 114 of plating material and each one of the modifying electrodes 116. These differences in electrical potential can be utilized to form a metal film having any predetermined thickness profile on the article 112 without the necessity of devising a different apparatus for each thickness profile desired.

Furthermore, although the method and apparatus of the present invention have been described with differences in electrical potential being utilized to obtain a metal film having a predetermined thickness profile, the predetermined thickness profile can also be obtained through the positioning of each one of the modifying electrodes 116 since the thickness profile of the metal film also depends on the positioning of the modifying electrodes 116. The modifying electrodes 116 which are positioned near to the article 112 will form thinner areas than the modifying electrodes 116, which are positioned far from the article 112 even if both the near and far modifying electrodes 116 are maintained at the same electrical potential. If desired, both the differences in electrical potential and the positioning of the modifying electrodes can be varied in order to obtain a metal film having a predetermined thickness profile. Thus, the method and apparatus of the present invention enables a metal film having a predetermined thickness profile to be obtained on a surface of an article through the process of electroplating. The deposition can be done accurately and easily and is especially useful where reproducibility is required.

We claim:

1. An electroplating apparatus for obtaining a metal film having a predetermined thickness profile on a surface of an article comprising:

a body of plating material, said body spaced from said surface of said article with the surface areas of said article to be most heavily plated in active relation with said body, a plurality of modifying electrodes, each one of said electrodes spaced from said surface of said article with the surface areas of said article to be least heavily plated in active relation with at least one of said electrodes, and means for providing differences in electrical potential between said article, said body of plating material and said modifying electrodes wherein at least some of said modifying electrodes can be provided with electrical potentials which are different from each other.

2. A method of electroplating a surface of an article with a metal film having a predetermined thickness profile comprising the steps of:

a. placing said article into a plating solution, b. placing a body of plating material into said solution, said body spaced from said article with the surface areas of said article to be most heavily plated in active relation with said body, c. placing a plurality of modifying electrodes into said solution, each one of said electrodes spaced from said article with the surface areas of said article to be least heavily plated in active relation with at least one of said electrodes, and d. providing differences in electrical potential between said article, said body of plating material and said modifying electrodes with at least some of said modifying electrodes being provided with electrical potentials which are different from each other.

3. A method in accordance with claim 2 in which an electrical potential is provided to each one of said modifying electrodes.

4. A method in accordance with claim 3 which includes adjusting the position of each one of said modifying electrodes in order to obtain said metal film.

* * * * *